United States Patent [19]

De Langhe et al.

[11] Patent Number: 5,471,511
[45] Date of Patent: Nov. 28, 1995

[54] DIGITAL PHASE-LOCKED LOOP ARRANGEMENT FOR USE IN A DESYNCHRONIZER

[75] Inventors: Marc R. F. De Langhe, Sleidinge; Peter P. F. Reusens, Laarne; Johan J. G. Haspeslagh, Heverlee; Stefaan M. A. Van Hoogenbemt, Mechlin, all of Belgium

[73] Assignee: Alcatel N.V., Netherlands

[21] Appl. No.: 260,771

[22] Filed: Jun. 16, 1994

[30] Foreign Application Priority Data

Jun. 18, 1993 [EP] European Pat. Off. .............. 93201758

[51] Int. Cl.$^6$ ................................ H03D 3/24; H04L 7/00
[52] U.S. Cl. ............................................ 375/376; 375/371
[58] Field of Search ...................................... 375/118, 120; 370/102, 108; 331/14, 27

[56] References Cited

U.S. PATENT DOCUMENTS

| | | | |
|---|---|---|---|
| 5,200,982 | 4/1993 | Weeber | 370/102 |
| 5,202,904 | 4/1993 | Kamada | 375/371 |
| 5,272,703 | 12/1993 | Peters | 370/102 |
| 5,285,206 | 2/1994 | Peters et al. | 341/100 |
| 5,349,310 | 9/1994 | Rieder et al. | 331/18 |

OTHER PUBLICATIONS

"Design and Performance Verification of a SONET-to-DS3 Desynchronizer", R. Hamlin, Jr., *Globecom* '91, 22.7.1–22.7.4, pp. 761–764.

"Transmission Networking: SONET and the Synchronous Digital Hierarchy", M. Sexton et al, Artech House, Norwood Mass. 1992, pp. 104–105.

*Primary Examiner*—Stephen Chin
*Assistant Examiner*—Huong Luu
*Attorney, Agent, or Firm*—Ware, Fressola, Van Der Sluys & Adolphson

[57] ABSTRACT

A digital phase locked loop arrangement is used in a desynchronizer demapping a plesiochronous stream from a synchronous bitstream is disclosed to remove jitter due to overhead gapping from the plesiochronous stream. To this end the part of the synchronous bitstream constituting the plesiochronous stream is written into a buffer memory (BUFF), the write address (WRADDR) of which is incremented at the rate of this plesiochronous part. The read address (RDADDR) for the buffer memory (BUFF) is derived from the write address (WRADDR) in the digital phase locked loop arrangement. Herein, a negative feedback for byte justifications in the synchronous bitstream and a positive feedback for bit justifications therein is provided so that byte justifications give rise to a lower change in the incrementing rate of the read address (RDADDR) but of longer duration, whereas bit justifications give rise to an increased change in this incrementing rate but of shorter duration.

10 Claims, 3 Drawing Sheets

| |
|---|
| V5 |
| R |
| 32 I BYTES |
| R |
| R |
| C1　C2　01　02　03　04　R　R |
| 32 I BYTES |
| R |
| R |
| C1　C2　05　06　07　08　R　R |
| 32 I BYTES |
| R |
| R |
| C1　C2　R　R　R　R　R　S1 |
| S2　I1　I2　I3　I4　I5　I6　I7 |
| 31 I BYTES |
| R |

FIG. 2

| V1 | V2 | V3 | V4 |
|---|---|---|---|
| 105 | 0 | 35 | 70 |
| ⋮ | ⋮ | ⋮ | ⋮ |
| 39 | 34 | 69 | 104 |

FIG. 3

DIGITAL PHASE-LOCKED LOOP ARRANGEMENT FOR USE IN A DESYNCHRONIZER

TECHNICAL FIELD

The present invention relates to a digital phase locked loop.

BACKGROUND OF THE INVENTION

Such an arrangement may include:

a low pass filter;

an oscillator, whose output is an output of said arrangement;

a subtracter to a positive input of which a binary signal is applied and an output of which is coupled to a negative input thereof via the series coupling of said filter and said oscillator;

a gapped clock generating a gapped clock stream normally constituted by consecutive like patterns each comprising pulses and gaps;

a control signal generator means providing at least a control signal;

a control means which in response to said control signal controls said gapped clock by adapting said patterns of said gapped clock stream;

a counter means which under the control of said controlled gapped clock stream provides said binary signal.

Such a digital phase locked loop arrangement is already known in the art, e.g. from the article 'Design and performance verification of a SONET-to-DS3 desynchronizer' by R. W. Hamlin, published in Globecom '91, 22.7.1–22.7.4, pp. 761–764. FIG. 1 of this article shows signals STS-1 and DS3 which are both digital signals having distinct frame structures each comprising an overhead part with control bits and a payload part with information bits. The signal DS3 is mapped in the payload part of the signal STS-1. The above phase locked loop arrangement is used in connection with a FIFO (First In First Out) buffer to remove jitter from the payload part of the DS3 signal as extracted from the STS-1 signal. This jitter is due to so-called overhead gapping, i.e. overhead—in the STS-1 and DS3 frame structures—which is not extracted from the STS-1 signal to obtain the payload part of the DS3 signal. The bits of the DS3 signal are written into the FIFO buffer at write addresses which constitute the binary input signal applied to the phase locked loop arrangements. As already mentioned, the write address is provided by the counter means controlled by the gapped clock. The latter clock forms part of the block 'pointer averaging circuit' shown in FIG. 3 of the above article and is derived under the control of the control means also included in the latter block, from a gapped DS3 clock which in its turn is derived in the block 'pointer tracking and DS3 destuff' shown in FIG. 2 of the above article, from the regular STS-1 clock by replacing pulses thereof with gaps when bits of the corresponding DS3 signal do not carry information but overhead.

The gapped DS3 clock and therefore also the gapped clock derived from it and used in the phase locked loop arrangement account for so-called bit stuffings and pointer movements. Bit stuffing occurs when a specific overhead bit of the DS3 signal contains information and is indicated by stuff control bits (constituting the above control signal) included in the overhead of the DS3 signal. To be noted that bit stuffing may occur when a so-called plesiochronous signal is mapped in the payload part of the DS3 signal, because of absence of synchronism between the plesiochronous and DS3 signals. A pointer movement may occur because of the mapping of the DS3 signal in the STS-1 signal. Indeed, to allow such mapping the STS-1 overhead contains a pointer value which in the STS-1 payload points to the beginning of the DS3 frame. Due to absence of synchronism of the DS3 and STS-1 signals, the beginning of the DS3 frame in the STS-1 payload and hence the pointer value, may vary from STS-1 frame to STS-1 frame. This is referred to as a pointer movement and the control signal for this pointer movement is constituted by the so-called H1 and H2 bytes included in the overhead of the STS-1 signal. In case of such a pointer movement, either the so-called H3 byte which is also part of the STS-1 overhead contains DS3 data (DS3 overhead or payload) or the byte which follows the H3 bytes and which is part of the STS-1 payload is a stuff byte, i.e. no DS3 bits (neither overhead nor payload) are contained therein.

Referring now to FIG. 1 of the above article, the like patterns normally constituting the gapped DS3 clock stream are composed as follows. 32 gaps followed by 688 clock periods into which the sequence: 19 gaps—205 pulses—24 gaps—208 pulses—24 gaps—208 pulses, is mapped, i.e. the latter sequence begins at one of the 688 clock periods and ends at the corresponding clock period of the next pattern.

The last gap of the second series of 24 gaps corresponds to a stuff opportunity bit. Thus, when the control means detects that the above stuff control bits (the control signal) indicate that this stuff opportunity bit contains information then the latter last gap is replaced by a pulse.

When the control means detects that the above H1 and H2 bytes (the control signal) indicate that a pointer movement occurs then either a sequence of 8 gaps is inserted after the above 32 gaps whereafter the sequence of 688 clock periods is continued, or 8 clock periods (pulses or gaps) of the 688 clock periods are substituted for the last 8 gaps of the above 32 gaps.

As a pointer movement would give rise to an unexpected but short variation (increase or decrease) of the rate with which the bits are written in the FIFO, i.e. of the rate of the information bits in the binary input signal, and thereby to a temporary but unacceptable variation of the average rate with which the bits are read from the FIFO, these pointer movements are treated in a second FIFO preceding the above first mentioned FIFO and by means of which they are leaked out over a longer period of time in order to avoid the mentioned unexpected variation. By choosing the FIFO length such that the most significant bits of the read and write addresses are high for half the length of the FIFO, and by comparing the most significant bits of the read and write addresses in the subtracter, a signal is created with a duty cycle proportional to the filling level of the FIFO. This signal is then applied to the low pass filter wherein jitter due to the overhead gapping is filtered out. The oscillator then provides a clock for a counter providing the read address, thus locking the average rate of bits read from the FIFO and corresponding to the read address to the average rate of bits written therein and corresponding to the write address. To be noted that the read address is incremented at a substantially constant rate due to the low pass filter included in the phase locked loop arrangement.

DISCLOSURE OF INVENTION

An object of the present invention is to provide a phase locked loop arrangement of the above known type, but wherein a change of the oscillator output rate due to the adaptation of said patterns in response to said control signal is limited.

According to the invention, this object is achieved due to the fact that said digital phase locked loop arrangement further includes:

a second subtracter having a second positive input coupled to the output of said first subtracter, a second negative input, and a second output coupled to said low pass filter;

a second clock; and a correction means controlled by said control signal and by said second clock and providing at its output, which is coupled to said second negative input, a correction value which is varied to zero at the rate of said second clock and which is varied with a predetermined value under the control of said control signal.

In this way, when the control signal indicates that an adaptation of one of the patterns of the gapped clock stream has been performed, the correction value applied to the negative input of the second subtracter is varied with the predetermined value. Thereby, the effect of an unexpected increase (or absence of increase) of the binary input signal caused by the adaptation of the patterns of the gapped clock stream in response to the control signal, is decreased. Indeed, without precautions this unexpected increase (or absence of increase) would give rise to an unexpected increase (or absence of increase) of the difference, between the output signal of the phase locked loop arrangement and the binary signal, provided at the output of the first subtracter. However, by subtracting the correction value from the latter difference this unexpected increase (or absence of increase) is at least partially removed from the signal applied to the low pass filter. On the other hand, by letting the correction value leak to zero, the unexpected increase (or absence of increase) is afterwards slowly applied to the phase locked loop arrangement and as a result, adaptations of the patterns in response to the control signal only slowly have an effect on the output signal of the phase locked loop arrangement the rate of which thereby will only slightly change instead of showing an unacceptably large variation. To be noted that this slight change will remain for a longer time than compared to the case where no correction value is applied. Thus, a compromise between the size of the change and the duration thereof may be made.

A further feature of the present invention is that said phase locked loop arrangement further includes:

a second correction circuit providing a second correction value which is zero except when indicated by a second control signal in which case it is equal to a second predetermined constant; and a summator with a first positive input coupled to the output of said second subtracter, with an output coupled to said low pass filter input, and with a second positive input connected to an output of said second correction circuit.

By adding the second correction value to the difference between the input and the output of the phase locked loop arrangement, the output will, upon a not expected increase (or absence of increase) of the digital number indicated by the second control signal, show an enlarged increase, but for a shorter time than compared to the case where no second correction value is applied. Thus, small but frequent adaptations of the patterns can be efficiently dealt with in that the effect on the oscillator output rate, i.e. the change thereof, is increased, but for a shorter period of time than compared to the case where no such second correction value is applied.

Another characteristic feature of the present invention is that said binary signal is associated to a bitstream including information bits and other bits, said information bits corresponding to said pulses of said gapped clock stream and said other bits corresponding to said gaps thereof.

As a result the phase locked loop arrangement provides a signal at its output which has the same average rate as the rate of the information bits of the bitstream, the latter rate being equal to the rate of the gapped clock.

Still another characteristic of the present invention is that said bitstream contains data bits and overhead bits corresponding to pulses and gaps according to said patterns, respectively, said data bits or said overhead bits including justification opportunity bits arranged in cells, said overhead bits including justification control bits constituting said control signal and indicating whether said justification opportunity bits constitute information bits or other bits, said data bits constituting either said justification opportunity bits or said information bits, and a said adaptation of said patterns in response to said control signal corresponding to a said data justification opportunity bit constituting a said other bit or to a said overhead justification opportunity bit constituting a said information bit.

In this way, the justification opportunity bits provide the possibility to map information bits, provided at a rate which is not synchronized to that of the bitstream, into this bitstream. This is for instance advantageously used for mapping so-called PDH (Plesiochronous Digital Hierarchy) signals (the information bits) into so-called SDH (Synchronous Digital Hierarchy) or SONET (Synchronous Optical Network) signals (the bitstream) as described e.g. in the book 'Transmission networking: SONET and the Synchronous Digital Hierarchy' by M. Sexton e.a., Artech House, 1992, pp. 104–105. When demapping the information bits from the bitstream one must account for justifications, i.e. adaptations of the patterns in response to the control signals, introduced in this mapping.

Yet another feature of the present invention is that said phase locked loop arrangement forms part of a desynchronizer for recovering a plesiochronous signal from said bitstream into which it is mapped, said desynchronizer further including:

a buffer memory to an input of which said bitstream is applied, said write address constituting said binary signal input to said phase locked loop arrangement, and said output of said phase locked loop arrangement providing a read address for said buffer memory.

Thus, the information bits are written in the buffer memory at consecutive memory locations thereof identified by consecutive write addresses. These information bits are read from the buffer memory at the rate of the read address, which, due to the low pass filter and to the correction value applied to the second subtracter, is substantially constant and substantially equal to the average increment rate of the write address. Thereby, the plesiochronous signal is recovered from the bitstream with substantially no jitter.

These and other objects, features and advantages of the present invention will become more apparent in light of the detailed description of a best mode embodiment thereof, as illustrated in the accompanying drawing.

BRIEF DESCRIPTION OF THE DRAWING

FIGS. 2 and 3 represent VC12 and DU12 frame structure according to CCITT.

BEST MODE FOR CARRYING OUT THE INVENTION

Figure 1:
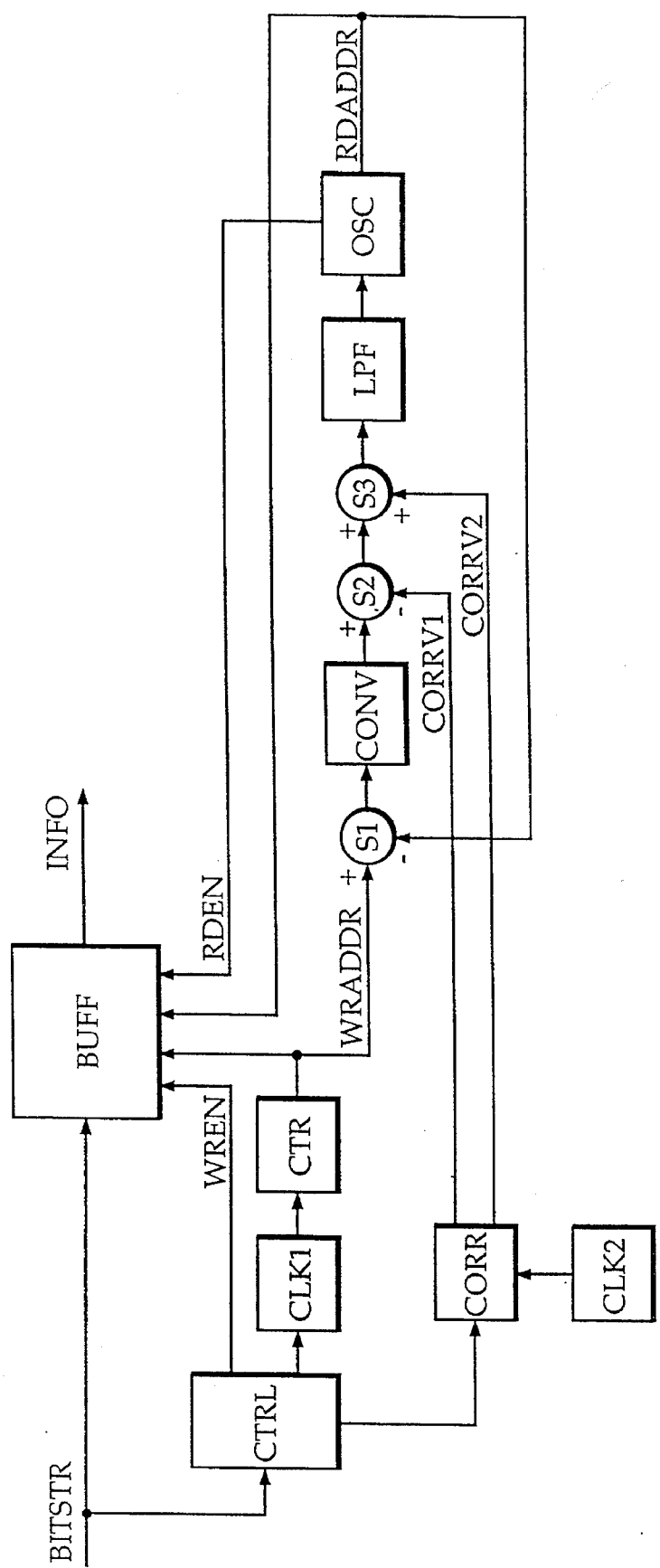
FIG. 1 shows a digital phase locked loop arrangement according to the present invention.
Figure 4:
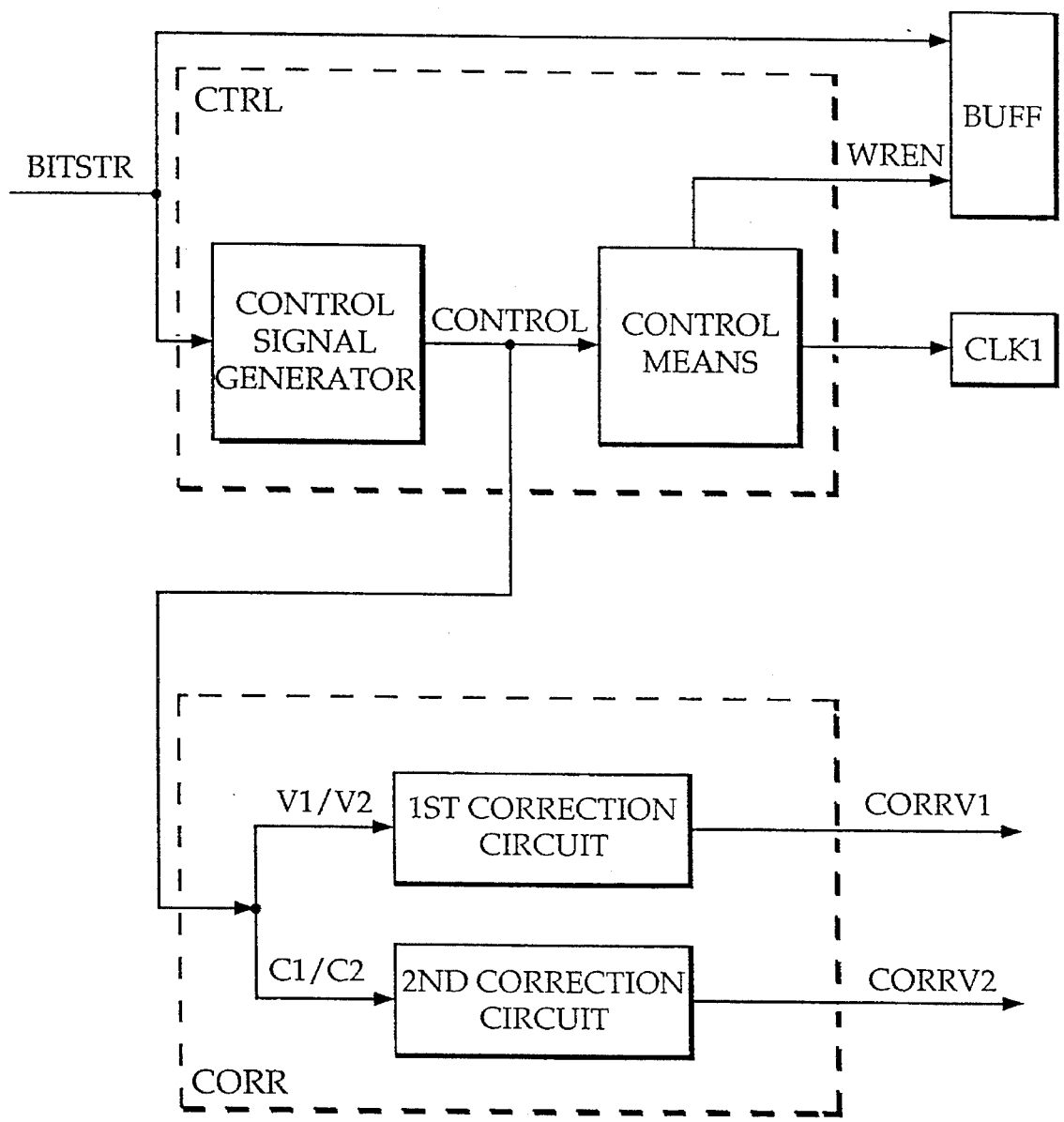

The phase locked loop arrangement shown in FIG. 1 is a desynchronizer adapted to recover at its output INFO a plesiochronous signal from a synchronous bitstream BITSTR applied to its like named input BITSTR.

For the example shown, the bitstream BITSTR has a so-called DU12 frame structure having an overhead part with control bits and a payload part with information bits. A so-called VC12 frame structure also having an overhead part and a payload part is mapped in the DU12 payload part. The above plesiochronous signal is mapped in the latter VC12 payload part. Both these frame structures are described in CCITT recommendation G709 (Synchronous Multiplexing Structure - Blue book), and are shown in FIGS. 2 and 3. It will be understood by those of skill in the art that the various CCITT recommendations have their ANSI counterparts, e.g., ANSI T1.105-1988, entitled "Digital Hierarchy Optical Interface Rates and Format Specifications", see particularly FIG. 57, showing "Asynchronous Mapping for DS3 Payload", and that the invention is broadly applicable thereto and to similar structures as well.

The VC12 frame structure of FIG. 2 is represented under the form of a table which comprises 140 bytes arranged in rows each containing one or mote bytes: V5 is a control byte; R is a fixed stuff byte or bit equal to 0; I is an information byte; I1 to I7 are information bits; C1 and C2 are justification control bits; S1 and S2 are justification opportunity bits; and O1 to O8 are control bits. The justification control bits C1 and C2 each appear three times and each of them is used a so-called two out of three majority voting procedure to decide whether or not bit justification is performed, i.e. whether the corresponding justification opportunity bits S1 and S2 contain information or not. More particularly, when at least two out of the three C1 (C2) bits are 0, then S1 (S2) contains information, whereas when at least two out of the three C1 (C2) bits are 1, then S1 (S2) contains no information.

The DU12 frame structure represented in FIG. 3 contains 144 bytes : those numbered 0 to 139 are the 140 consecutive bytes of the above described VC12 structure; V1 and V2 are justification control bytes; V3 is a justification opportunity byte; and V4 is a byte not assigned by CCITT and reserved for future use. When the V1 and V2 bytes are concatenated then the ten least significant bits thereof constitute a pointer value indicating the offset, expressed in bytes, of the V5 byte with respect to the last bit of this V1–V2 pointer, i.e. pointing to the beginning of the VC12 frame in the DU12 frame. When no byte justification occurs the pointer value remains the same for successive DU12 frames. When e.g. the above ten pointer bits are all 0 the first byte of the VC12 frame immediately follows the V2 byte, i.e. the V5 byte coincides with the '0' byte of FIG. 3. When a negative byte justification occurs, then the V3 byte is a byte of the VC12 frame, which is indicated by an inversion of the uneven ones of the ten pointer bits. Subsequent pointer values are then decremented by one. On the contrary, when a positive byte justification occurs, then the byte following the V3 byte contains stuff which is indicated by an inversion of the even ones of the ten pointer bits. Subsequent pointer values are then incremented by one.

Referring to FIG. 1 the desynchronizer shown therein includes a buffer memory BUFF with size n and to an input of which the above bitstream BITSTR is applied and which when read out provides the above plesiochronous signal at its output INFO. This bitstream BITSTR is also applied to an input of a control Circuit CTRL and to an input of a correction circuit CORR. FIG. 3 shows details of the control circuit CTRL and the correction circuit CORR.

The operation of the control circuit CTRL is synchronized to the bitstream BITSTR by a synchronization procedure which is not discussed here and due to which CTRL knows the position of the bits and bytes in the frame structure of the bitstream BITSTR shown in FIGS. 2 and 3. Suffice it to say that the control circuit CTRL, as shown in more detail in FIG. 3, comprises a control signal generator, responsive to the bitstream BITSTR, for providing at least a control signal (V1/V2, C1/C2), and having a control means, responsive to the control signal (V1/V2, C1/C2), for providing a pattern adaptation signal to a gapped clock CLK1 for providing a gapped clock stream normally constituted by consecutive like patterns, each comprising pulses and gaps. The purpose of CTRL is to control the writing operation of the bitstream BITSTR in the buffer memory BUFF in such a way that only information bits are written therein, thus extracting the plesiochronous signal from this bitstream. CTRL performs this function by monitoring the above mentioned justification control bits and bytes contained in the bitstream. Indeed, CTRL is thus able to identify the bits of this bitstream BITSTR either as information bits, which have to be written in the buffer BUFF, or as overhead bits, which have to be prevented from being written in the buffer BUFF. More particularly, when an information bit is applied to the input of the buffer memory BUFF, then the control circuit CTRL activates a write enable signal WREN, whereas when an overhead bit is applied to this buffer input, then CTRL deactivates the write enable signal WREN. CTRL applies this write enable signal WREN to a write enable input of the buffer memory BUFF and thus allows information bits of the bitstream BITSTR to be written therein when WREN is activated, and prevents overhead bits to be written in the buffer BUFF when WREN is deactivated. The control circuit CTRL furthermore derives from the input bitstream BITSTR a gapped clock stream provided by a clock circuit CLK1 and normally constituted by like patterns of pulses and gaps (absences of pulses). The pulses correspond to the information bits, whereas the gaps correspond to the overhead bits. This gapped clock stream is applied to an address counter CTR providing successive write addresses WRADDR for the buffer memory BUFF. This counter CTR operates modulo n (n being the size of the buffer memory BUFF) and is incremented by one at the rate of the pulses of the gapped clock stream.

The detection and correction circuit CORR is controlled by a second clock CLK2 and provides two correction values CORRV1 and CORRV2 in response to its detection of justification bits in the input bitstream BITSTR. More particularly, when CORR detects the presence in the bitstream BITSTR of a negative byte justification, as mentioned above and as indicated by the justification control bytes V1 and V2, it increments the correction value CORRV1 by 8 by means of a first correction circuit. On the other hand, CORR decrements CORRV1 by 8 when a positive byte justification is detected. Furthermore, CORR varies this correction value CORRV1 to zero in steps of one at the rate of the clock CLK2, i.e. it is decremented by one when positive or incremented by one when negative until it reaches zero. CORR keeps the correction value CORRV2 equal to zero except when it detects a bit justification in the bitstream BITSTR. In that case, CORR sets CORRV2 to one for the duration of this bit justification by means of a second correction circuit.

Both correction values CORRV1 and CORRV2 and the above write address WRADDR are applied to a digital phase locked loop forming part Of the arrangement which between its input WRADDR and its output RDADDR includes the series connection of a subtracter S1, a conversion circuit CONV, a subtracter S2, a summator S3, a low pass filter LPF and an oscillator OSC whose output constitutes the output of the phase locked loop and is fed back to the negative input of subtracter S1. The oscillator OSC includes an accumulator providing a read address RDADDR, and a plesiochronous clock providing a plesiochronous clock signal (not shown in detail). The read address RDADDR is by the accumulator modulo n (n being the size of the buffer memory BUFF) incremented by one at the rate of the plesiochronous clock. This clock rate is controlled by the error signal provided by S3, i.e. it is increased when this error signal increases and decreased when this error signal decreases. The write address WRADDR is applied to a positive input of S1, CONV is connected to a positive input of S2, to a negative input of which CORRV1 is applied, and CORRV2 is applied to a positive input of S3. The read address RDADDR provided by the output of OSC is applied to the buffer memory BUFF as well as to the negative input of S1 as already mentioned. A second output of the oscillator OSC furthermore provides a read enable signal RDEN which is set and reset at the plesiochronous clock rate, i.e. at the rate of change of RDADDR.

The above mentioned incrementing of the write address WRADDR by one and activation of the write enable signal WREN are performed for each information bit of the bitstream BITSTR, i.e. they are performed for: each bit of one of the I bytes shown in FIG. 2; each of the bits I1 to I7 shown in FIG. 2; the S1 (S2) bit when at least two out of three C1 (C2) bits are zero. To be noted that in case a negative justification is indicated by the bytes V1 and V2 the bits of the V3 byte shown in FIG. 3 contain bits (information or other bits) of the VC12 frame structure shown in FIG. 2, and hence they may, but do not necessarily, give rise to the above incrementing of WRADDR and activation of WREN. The information bits are each written into the buffer memory BUFF and the corresponding write address WRADDR is also applied to the digital phase locked loop arrangement. Therein, it is compared to the read address RDADDR in the subtracter S1 whose output signal is then converted in the conversion circuit CONV which has a staircase transfer characteristic from its input to its output. As a result, when the output or error signal provided by S1 to the conversion circuit CONV varies only slightly, and supposing the correction values CORRV1 and CORRV2 are equal to zero, this does not influence the output RDADDR of the digital phase locked loop arrangement so stabilizing this output RDADDR. In S2 the correction value CORRV1 is subtracted from the output signal of CONV, thereby providing an error signal in which the abrupt effect of the byte justification on the write address WRADDR is compensated. Indeed, when such a byte justification occurs in the bitstream BITSTR this has for effect that an additional byte (8 additional bits) is written into the buffer memory BUFF and that hence the write address WRADDR is increased by 8. As a consequence, the error signal applied to the series connected low pass filter LPF and oscillator OSC and therefore also the read address RDADDR provided at the output of the digital phase locked loop arrangement, will not be abruptly affected by byte justification. However, since as mentioned above the correction value CORRV1 is varied to zero the effect of byte justification on the write address WRADDR is slowly introduced in the digital phase locked loop arrangement and its output RDADDR is slowly influenced by it. As a result, and supposing for now that CORRV2 is zero, the error signal at the input of the low pass filter LPF and the signal at the output thereof both increase slowly. The read address RDADDR output by the oscillator increases at a slightly higher rate and this causes the error signal applied to the input of the low pass filter LPF to decrease so that a negative feedback is obtained. Because the correction value CORRV1 only slowly varies to zero, the rate at which the read address RDADDR is incremented increases only slightly. However, it should be noted that when byte justifications of the same type (all negative or all positive) would follow one another in the bitstream BITSTR at too high a rate, then the correction value CORRV1 would become so large that the buffer memory BUFF would overflow. To avoid such a situation, the correction value CORRV1 is limited between a maximum value of +15 and a minimum value of −16, which can be represented by 5 bits (4 bits and a sign bit). As a result, in case such like byte justifications follow one another too fast, the rate at which the read address RDADDR is incremented will increase significantly, but no overflow of the buffer memory BUFF will occur and therefore no bits will be lost. To prevent CORRV1 from reaching its limits too often, the rate of the clock CLK2 may be increased thereby varying CORRV1 faster to zero.

In summator S3 the error signal provided by subtracter S2 is increased by the correction value CORRV2, thereby providing an corrected error signal. When a negative bit justification occurs as indicated by the above justification control bits C1/C2 the latter corrected error signal is increased by one so that the rate at which the read address RDADDR is incremented is temporarily increased, i.e. for the duration of one bit, whereby the additional filling of the buffer memory BUFF by the extra information bit written therein is substantially immediately compensated because an information bit is read from it. As a result, the rate at which the read address RDADDR is incremented is increased, but this increase is small as only one extra bit must be read from the buffer memory BUFF. On the other hand, no risk for overflow of BUFF due to bit justifications occurs.

To be noted that in the present embodiment bit justifications give rise to a typical variation in the bit rate of maximum 50 ppm, whereas byte justifications give rise to a typical bit rate variation of maximum 5 ppm. Furthermore, deviations between the rate of the bitstream BITSTR and that of the oscillator OSC may typically rise up to maximum 30 ppm. The above number of 50 ppm is due to the high rate at which bit justifications occur rather than to the impact of single bit justifications on the bitrate, whereas the number of 5 ppm is due to the impact of single byte justifications on the bitrate rather than to the rate at which byte justifications occur. All these deviations are compensated by the phase locked loop arrangement.

To be noted that the correction values CORRV1 and CORRV2 may also be applied to the phase locked loop arrangement as so-called pulse density modulated (PDM) signals whose average value is equal to the respective correction value. This has the advantage of providing the possibility to apply more accurate correction values to S2 and S3. Indeed, since the average value of the PDM signal can be controlled via the duty cycle thereof, this average value can be more accurately controlled than the value of a fixed correction value. Furthermore, PDM signals provide the possibility to apply correction values which correspond to fractions of a bit in the bitstream BITSTR. To be noted that the pulsed nature of the PDM signals is filtered in the low pass filter LPF.

While the principles of the invention have been described above in connection with specific apparatus, it is to be clearly understood that this description is made only by way of example and not as a limitation on the scope of the invention. Similarly, although the invention has been shown and described with respect to a best mode embodiment thereof, it should be understood by those skilled in the art that the foregoing and various other changes, omissions and additions in the form and detail thereof may be made therein without departing from the spirit and scope of the invention.

We claim:

1. Digital phase locked loop arrangement for use in a desynchronizer, comprising:

a low pass filter (LPF), responsive to a corrected read/write address difference signal, for providing a low pass filtered signal;

an oscillator (OSC), responsive to the low pass filtered signal for providing a read address signal (RDADDR);

a subtracter (S1), responsive at a positive input thereof to a write address signal (WRADDR) and at a negative input thereof to the read address signal, for providing a read/write address difference signal;

a gapped clock (CLK1), responsive to a pattern adaptation signal, for providing a gapped clock stream normally constituted by consecutive like patterns each comprising pulses and gaps;

a control (CTRL) having a control signal generator means, responsive to a bitstream (BITSTR), for providing at least a first control signal (V1/V2) and having a control means, responsive to the first control signal (V1/V2), for providing the pattern adaptation signal for adapting said patterns of said gapped clock stream;

a counter means (CTR), responsive to the gapped clock stream, for providing the write address signal (WRADDR);

wherein said digital phase locked loop arrangement further comprises:

a second subtracter (S2), responsive at a positive input thereof to the read/write address difference signal, and responsive at a negative input thereof to a correction value signal (CORRV1), for providing the corrected read/write address difference signal;

a second clock (CLK2) for providing a second clock signal having a second rate; and a correction means (CORR) including a first correction circuit, responsive to the first control signal (V1/V2) and to the second clock (CLK2) signal, for providing the correction value signal (CORRV1) which is varied to zero at the second rate of the second clock (CLK2) and which is varied with a predetermined value in response to the first control signal (V1/V2).

2. Phase locked loop arrangement according to claim 1, further comprising:

a second correction circuit, responsive to a second control signal (C1/C2) from the control (CTRL), for providing a second correction value signal (CORRV2) which is zero except when indicated by the second control signal (C1/C2) in which case it is equal to a second predetermined value; and a summer (S3) with, responsive at a first positive input thereof to the corrected read/write address difference signal from the second subtracter (S2) and responsive at a second positive input thereof to the second correction value signal, for providing the corrected read/write address difference signal corrected according to both the correction value signal (CORRV1) and the second correction value signal (CORRV2).

3. Phase locked loop arrangement according to claim 1, wherein the correction value signal (CORRV1) is positive when the first control signal (V1/V2) adapts said patterns in such a way that pulses are introduced in said gapped clock stream, and negative when said first control signal (V1/V2) adapts said patterns in such a way that gaps are introduced in said gapped clock stream.

4. Phase locked loop arrangement according to claim 1, wherein said write address signal (WRADDR) is derived from the bitstream (BITSTR) including information bits and other bits, said information bits corresponding to said pulses of said gapped clock stream and said other bits corresponding to said gaps thereof.

5. Phase locked loop arrangement according to claim 4, wherein said bitstream (BITSTR) contains data bits and overhead bits corresponding to pulses and gaps according to said patterns, respectively, said data bits or said overhead bits including justification opportunity bits (S1, S2, V3) arranged in cells, said overhead bits including justification control bits constituting said first control signal and said second control signal and indicating whether said justification opportunity bits (S1, S2, V3) constitute information bits or other bits, said data bits constituting either said justification opportunity bits or said information bits, and a said adaptation of said patterns in response to said first control signal and said second control signal corresponding to a said data justification opportunity bit constituting a said other bit or to a said overhead justification opportunity bit constituting a said information bit.

6. Phase locked loop arrangement according to claim 5, wherein said bitstream (BITSTR) is a synchronous bitstream into information bits of which plesiochronous signals (INFO) are mapped.

7. Phase locked loop arrangement according to claim 5, wherein it forms part of a desynchronizer for recovering a plesiochronous signal (INFO) from said bitstream (BITSTR) into which it is mapped, said desynchronizer further comprising:

a buffer memory (BUFF) to an input of which said bitstream (BITSTR) is provided, and having a write address input to which said write address signal is provided and wherein said read address signal (RDADDR) is provided to said buffer memory (BUFF).

8. Phase locked loop arrangement according to claim 1, wherein said correction value signal (CORRV1) is provided as a pulse density modulated signal whose average value equals said correction value.

9. Phase locked loop arrangement according to claim 2, wherein the second correction value signal (CORRV2) is positive when the second control signal (C1/C2) adapts said patterns in such a way that a pulse is introduced in said gapped clock stream, and negative when said second control signal (C1/C2) adapts said patterns in such a way that a gap is introduced in said gapped clock stream.

10. Phase locked loop arrangement according to claim 2, wherein said second correction value signal (CORRV2) is provided as a pulse density modulated signal whose average value equals said correction value.

* * * * *